June 2, 1942.    J. WINKLER    2,284,787
FILTER
Filed April 8, 1938    2 Sheets-Sheet 1
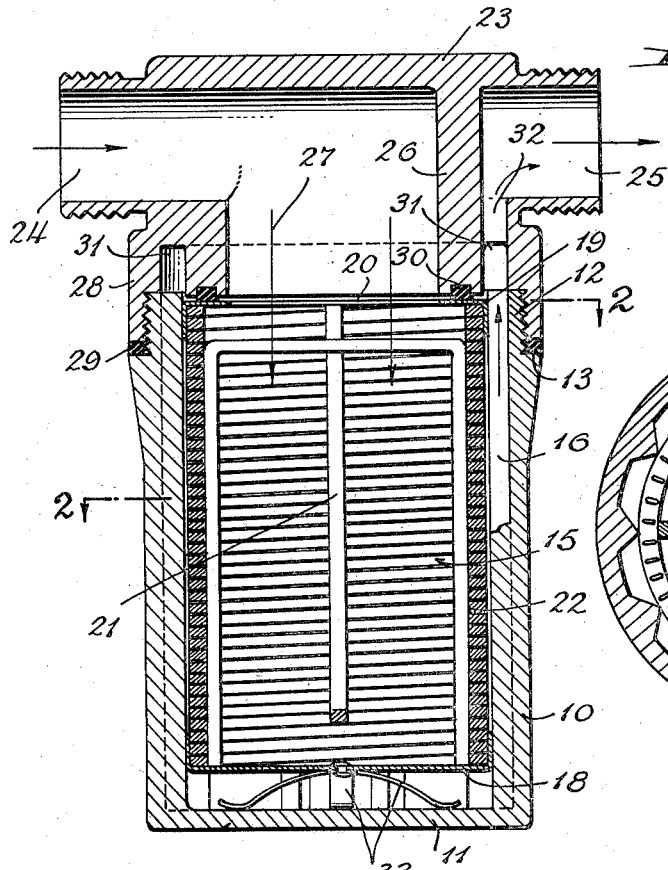
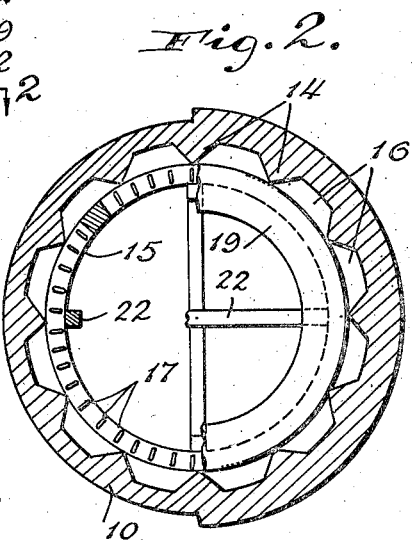
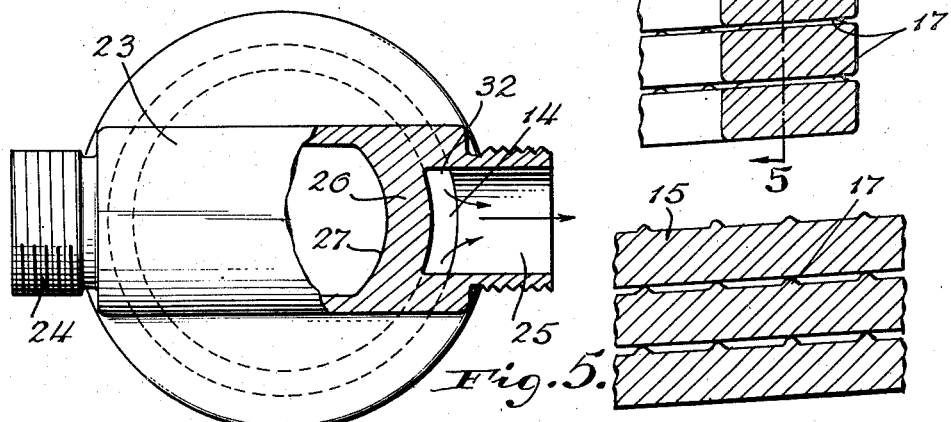
INVENTOR.
JACK WINKLER
BY Fritz Ziegler
ATTORNEY.

June 2, 1942.  J. WINKLER  2,284,787
FILTER
Filed April 8, 1938  2 Sheets-Sheet 2
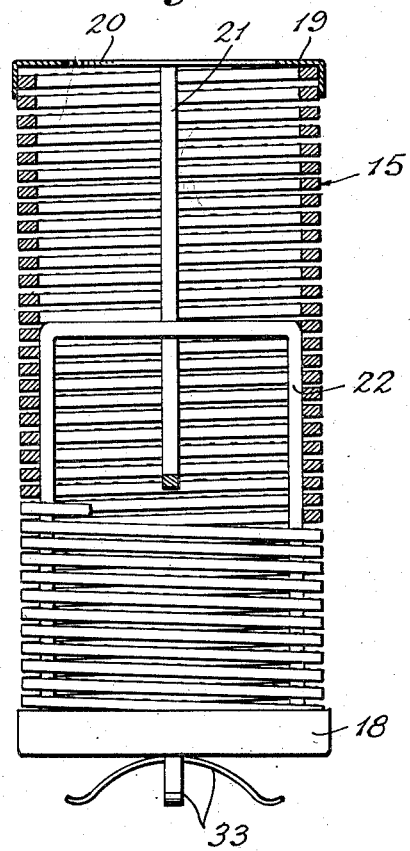
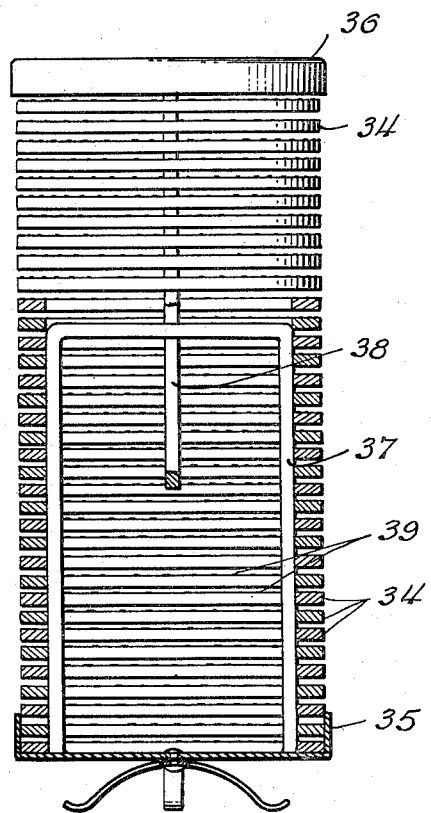
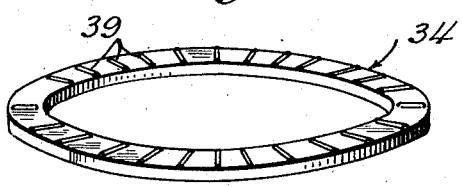
INVENTOR.
JACK WINKLER
BY
ATTORNEY Patented June 2, 1942

2,284,787

UNITED STATES PATENT OFFICE 2,284,787

FILTER

Jack Winkler, Brooklyn, N. Y.

Application April 8, 1938, Serial No. 200,835

3 Claims. (Cl. 210—169)

This invention relates to improvements in filters and has for one of its objects the provision of an improved filter of simple and practical construction wherein liquids such as oil and gasoline, will be effectively filtered in their passage therethrough.

Another object is to construct a filtering unit of a plurality of ring-like members which cooperate to form filtering spaces therebetween and which are so assembled and mounted in the casing of the filter as to enable the unit to be readily removed from said casing and said members separated so that they may be thoroughly cleaned of accumulated sediment before replacement into the casing.

The above and other objects will appear more clearly from the following detailed description when taken in connection with the accompanying drawings which illustrate preferred embodiments of the inventive idea.

In the drawings:

Figure 1 is a vertical longitudinal section through a filter constructed in accordance with the invention and showing one embodiment of filtering unit therein in which the ring-like members of the filtering element are in the form of portions of a helix.

Figure 2 is a transverse section substantially on the line 2—2 of Fig. 1.

Figure 3 is a top plan view of the filter, partly broken away and shown in section.

Figure 4 is a fragmentary vertical sectional view through the filtering unit.

Figure 5 is a section on the line 5—5 of Fig. 4.

Figure 6 is an elevational view, partly in section, of the filtering unit of Figs. 1 to 5, showing the filtering element expanded so that the convolutions thereof are separated for cleansing purposes.

Figure 7 is a view similar to Fig. 6 showing another form of filtering element in which the same consists of a plurality of separate rings, and, Figure 8 is a perspective view of one of the rings shown in Fig. 7.

Referring more particularly to Figs. 1 to 6, the filter is shown as comprising a cylindrical casing 10 having a bottom 11 and an open upper end having an externally screw threaded section 12 at the inner end of which is formed an annular shoulder 13. For a purpose which will appear in the course of the description the inner wall of the casing 10 is provided with a plurality of circumferentially spaced and vertically disposed ribs 14.

The filtering unit shown in Figs. 1 to 6 which embodies certain of the characteristic features of the present invention, is adapted to be contained within the casing 10 when in its operative position and comprises a filtering element generally indicated by the numeral 15. In the embodiment being described, this element takes the form of a helix the diameter of which is such that the outer surfaces of the convolutions or ring-like members thereof will contact the inner edges of the ribs 14 of the casing, when the unit is in position, and thus combine with said ribs to form the intervening fluid outlet channels 16 into which the oil or gasoline, or any other liquid being filtered, will flow after it has been filtered by passage between the convolutions of the helix. In order to provide filtering spaces between said convolutions, each of the latter, as shown in Figs. 4 and 5, is provided upon its upper surface with a series of circumferentially spaced and radially extending rib-like projections 17. These projections are very small in height so that when they are engaged by the undersurface of the next uppermost convolution the filtering space formed between two adjacent convolutions will be very minute so that a proper filtering action will take place as the liquid flows from the interior of the filtering unit into the outlet channel 16.

The filtering unit further comprises a supporting structure for the element 15 which preferably takes the form of end receptacles 18 and 19 at the lower and upper ends of said element. The lower receptacle 18 is closed and receives therein the lowermost convolutions of the helix which may be secured in said receptacle by soldering or through any other suitable means. The uppermost convolutions of the helix are similarly secured in the receptacle 19 which is provided therein with a central opening 20 through which liquid to be filtered may flow into the interior of the filtering unit. The supporting structure further comprises two rod-like frames 21 and 22 of U-form carried, respectively, by the upper and lower receptacles and arranged in planes at right angles to each other. Each of the frames 21, 22 extends for a major portion of the length of the element 15 and the side portions of said frames engage the inner surfaces of the convolutions of the helix at diametrically opposed points. These frames are provided primarily for maintaining the convolutions in alignment with each other when the filtering unit is withdrawn from the casing 19, as shown in Fig. 6, for the purpose of cleaning the element 15. When thus withdrawn, the said element may be expanded so as to separate the convolutions thereof and thus enable the element, and more specifically the filtering passages between the projection 17 to be thoroughly cleansed and accumulated sediment removed therefrom.

The filter is completed by the provision of a head 23 provided with diametrically opposed inlet and outlet ports 24 and 25, respectively. The interior of the head is provided with an annular partition 26 which forms a conduit 27 that establishes communication between the inlet 24 and the interior of the filtering unit through the opening 20 in the upper receptacle 19. When the head is in position on the casing, the conduit 27 is aligned with said opening 20 and in order to secure said head upon the casing, the former is provided with an internally threaded flange 28 adapted to engage the threaded extension 12 of the casing. To properly seal the joint between the casing and head, a gasket 29 is placed upon the shoulder 13 of the casing so as to be engaged and compressed by the lower end of the flange 28. When thus positioned on the casing, the partition 26 of the head is co-extensive with the rim portion of the receptacle 19 surrounding the opening 20 and in order to prevent the escape of unfiltered liquid between said partition and receptacle, an annular sealing gasket 30 is seated in the lower edge of the partition 26 for engagement with said receptacle. The partition 26 also combines with the flange 28 of the head to form an annular outlet chamber 31 which will communicate with the various outlet channels 16 formed by the ribs 14 and the filtering element 15 so that the liquid which has been filtered by passage between the convolutions of the element 15 will flow upwardly through said channels into the chamber 31 and from thence through the outlet 32 into the outlet port 25. It is desirable to provide additional means for compressing the convolutions of the element 15 so that the same will be held in yielding contact with each other, and to also exert a pressure upon the filtering unit as a whole so that the upper end thereof will be held in intimate contact with the sealing gasket 30. For this purpose, the lower receptacle 18 of the filtering unit has secured thereto the intermediate portions of a pair of angularly disposed leaf springs 33 the ends of which will contact the bottom 11 of the casing 10 and thus act to exert an upward pressure upon the filtering unit when the parts are assembled, as in Fig. 1.

In the form of unit shown in Figs. 7 and 8 the filtering element comprises a plurality of individual rings 34 held in cooperative relation between the receptacles 35 and 36, similar to the receptacles 18 and 19, which also carry the supporting and retaining frames 37, 38. As best illustrated in Fig. 8, the upper surface of each ring 34 is provided with the spaced radially extending projections 39, similar to the projections 17, which engage the undersurface of the superimposed ring so as to form therebetween the filtering spaces through which the liquid flows from the interior of the filtering unit into the channels 16 when said unit is positioned within the casing. The filtering unit of Figs. 7 and 8 may also be withdrawn from the casing and, as shown in Fig. 7, when thus withdrawn the various rings 34 may be separated so as to enable the same to be thoroughly cleaned before replacement in the casing 10.

What is claimed is:

1. A filtering element adapted for insertion into the casing of a filter, said element being in the form of a helix having a series of convolutions provided with means to minutely space one from the other to provide filtration passages therebetween, a supporting structure for said filtering element including a receptacle at one end thereof secured to the convolutions at one end of the helix, a frame secured to said receptacle, said frame extending outwardly from said receptacle into the interior of said helix and slidably engaging the inner peripheries of a major portion of the convolutions of said helix, and a second receptacle at the other end of said supporting structure secured to the convolutions at the other end of said helix, a second frame secured to said second receptacle and extending outwardly from said second receptacle into the interior of said helix and slidably engaging the inner peripheries of a major portion of said convolutions of said helix, and the end portions of said frames being unsecured to each other and extending into overlapping relation with each other, whereby said receptacles may be moved in opposite directions and the filtering element expanded so as to separate the convolutions thereof without destroying their alignment.

2. A filtering element adapted for insertion into the casing of a filter, said element being in the form of a helix having a plurality of convolutions arranged in juxtaposed relation, with a surface of one convolution having spaced projections engaging an opposed surface of a next adjacent convolution to form filtration passages between said convolutions, a supporting structure for said filtering element including a receptacle at one end thereof secured to the convolutions at one end of said helix, a frame secured to said receptacle, said frame extending outwardly from said receptacle into the interior of said helix and slidably engaging the peripheries of a major portion of said convolutions of the helix, and a second receptacle at the other end of said supporting structure secured to the convolutions at the other end of said helix, a second frame secured to said second receptacle and extending outwardly from said second receptacle into the interior of said helix and slidably engaging the inner peripheries of a major portion of said convolutions, and the end portions of said frames being unsecured to each other and overlapping each other, whereby said receptacles may be moved in opposite directions and the element expanded so as to separate the convolutions thereof without destroying their alignment.

3. In a filter, a cylindrical casing having a wall provided on its interior surface with a plurality of circumferentially spaced ribs extending the full length of said wall and forming narrow fluid channels therein, a filtering element in said casing in the form of a cylinder constituted by the convolutions of an expansible helix adjacent convolutions of which have opposed surfaces one of which is provided with projections contacting the other surface to maintain said adjacent convolutions in spaced relation, a pair of receptacles, one secured to each end of said helix, a pair of U frames, one having its ends secured to one receptacle and being otherwise unsecured and the other having its ends secured to the other receptacle and being otherwise unsecured, said U frames being disposed angularly and in overlapping relation to each other, with the intermediate portion of each frame extending through the other frame, and the side portions of said frames slidably contacting the interior surfaces of said convolutions of the helix, whereby said helix may be expanded without destroying the alignment of the convolutions thereof, and a head for said casing having an inlet port communicating with the interior of said filtering element through one of said receptacles and further having an outlet port, said head being provided with an interior partition combining with a portion of said head to form an annular outlet chamber disposed in alignment with the channels in said casing and establishing communication between said channels and said outlet port.

JACK WINKLER.